(12) United States Patent
Usui

(10) Patent No.: US 7,264,395 B2
(45) Date of Patent: Sep. 4, 2007

(54) TEMPERATURE SENSOR CAPABLE OF AUTOMATIC INSTALLATION

(75) Inventor: Kazuo Usui, Oogaki (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/389,222

(22) Filed: Mar. 27, 2006

(65) Prior Publication Data

US 2006/0165154 A1     Jul. 27, 2006

Related U.S. Application Data

(62) Division of application No. 11/043,073, filed on Jan. 27, 2005, now Pat. No. 7,153,024.

(30) Foreign Application Priority Data

Jan. 28, 2004  (JP) ............................... 2004-20344
Jan. 28, 2004  (JP) ............................... 2004-20345

(51) Int. Cl.
*G01K 1/00*     (2006.01)
(52) U.S. Cl. ................................... 374/208
(58) Field of Classification Search ............... 374/208, 374/179, 183
See application file for complete search history.

(56) References Cited

U.S. PATENT DOCUMENTS

| | | | |
|---|---|---|---|
| 2,992,402 A | 7/1961 | Thomas | |
| 3,584,510 A | 6/1971 | Harris | |
| 4,463,800 A * | 8/1984 | Hadden | ...................... 165/11.1 |
| 4,510,343 A * | 4/1985 | Sivyer | ......................... 136/242 |
| 4,758,688 A | 7/1988 | Aschberger | |
| 5,018,875 A | 5/1991 | Cook | |
| 5,743,646 A * | 4/1998 | O'Connell et al. | ......... 374/148 |
| 5,918,292 A | 6/1999 | Smith | |
| 5,999,081 A | 12/1999 | Hannigan et al. | |
| 6,328,468 B1 | 12/2001 | Nagano et al. | |
| 6,367,974 B1 * | 4/2002 | Lin | ............................. 374/179 |
| 6,457,857 B1 | 10/2002 | Gul | |
| 6,536,950 B1 | 3/2003 | Green et al. | |
| 6,997,604 B2 | 2/2006 | Hanzawa et al. | |
| 2002/0085617 A1 | 7/2002 | Gul | |
| 2002/0172259 A1* | 11/2002 | Bach | ......................... 374/208 |
| 2005/0175066 A1 | 8/2005 | Nakabayashi | |

FOREIGN PATENT DOCUMENTS

| | | |
|---|---|---|
| JP | A-5-238253 | 9/1993 |
| JP | A-6-048168 | 2/1994 |
| JP | A-7-237440 | 9/1995 |
| JP | A-2002-211233 | 7/2002 |

* cited by examiner

*Primary Examiner*—Diego Gutierrez
*Assistant Examiner*—Megann E Vaughn
(74) *Attorney, Agent, or Firm*—Posz Law Group, PLC

(57) ABSTRACT

The present invention provides a temperature sensor with an improved reliability of a root portion of a harness. A substantially rod-shaped guide portion 28 vertically protruding on a vertical wall 20c of the substrate is provided and the harness 40 is fixed to the guide portion 28 in a contacting state by accommodating the guide portion 28 and the harness 40 in a vinyl tube 44. Because of this configuration, a root portion of the harness 40, which comes out from the substrate 20, is unlikely to be bent due to the rigidity of the guide portion 28, and is not broken and disconnected.

5 Claims, 13 Drawing Sheets

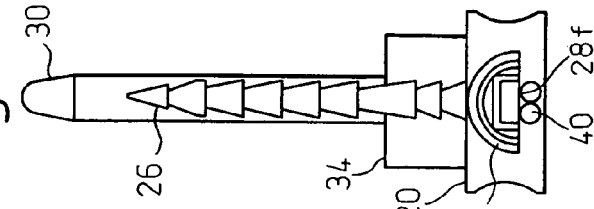
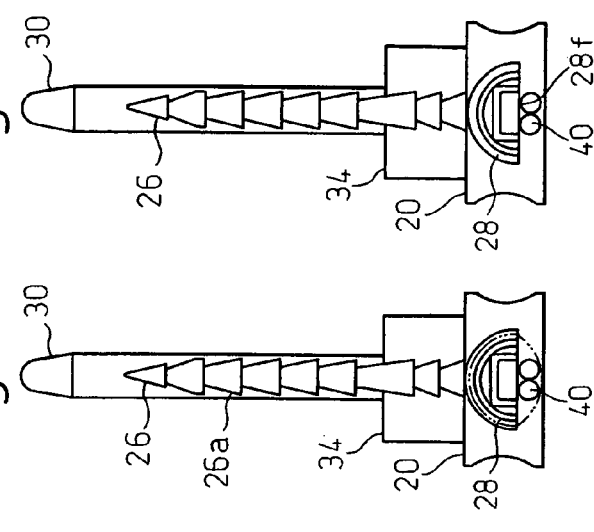
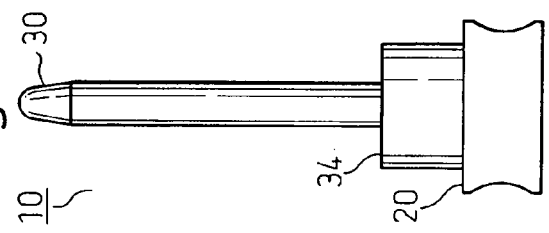
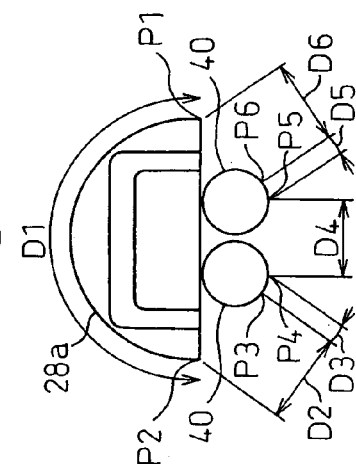
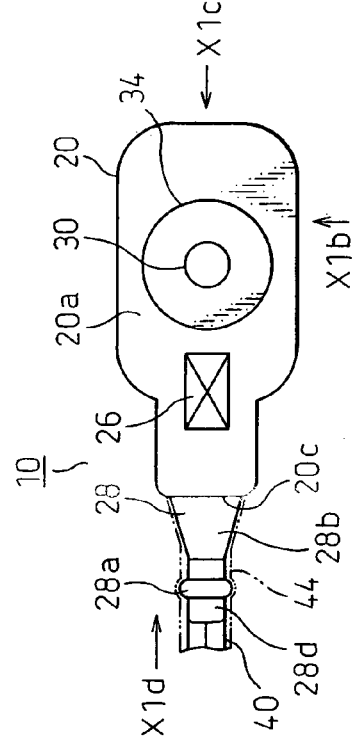
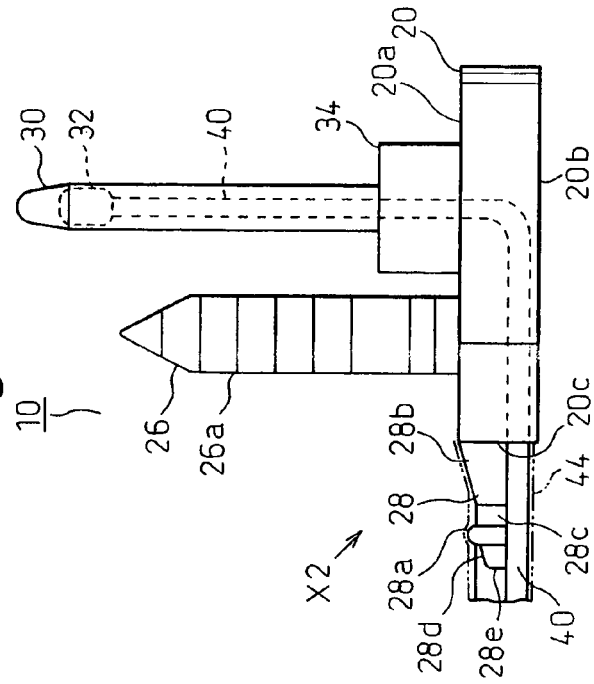

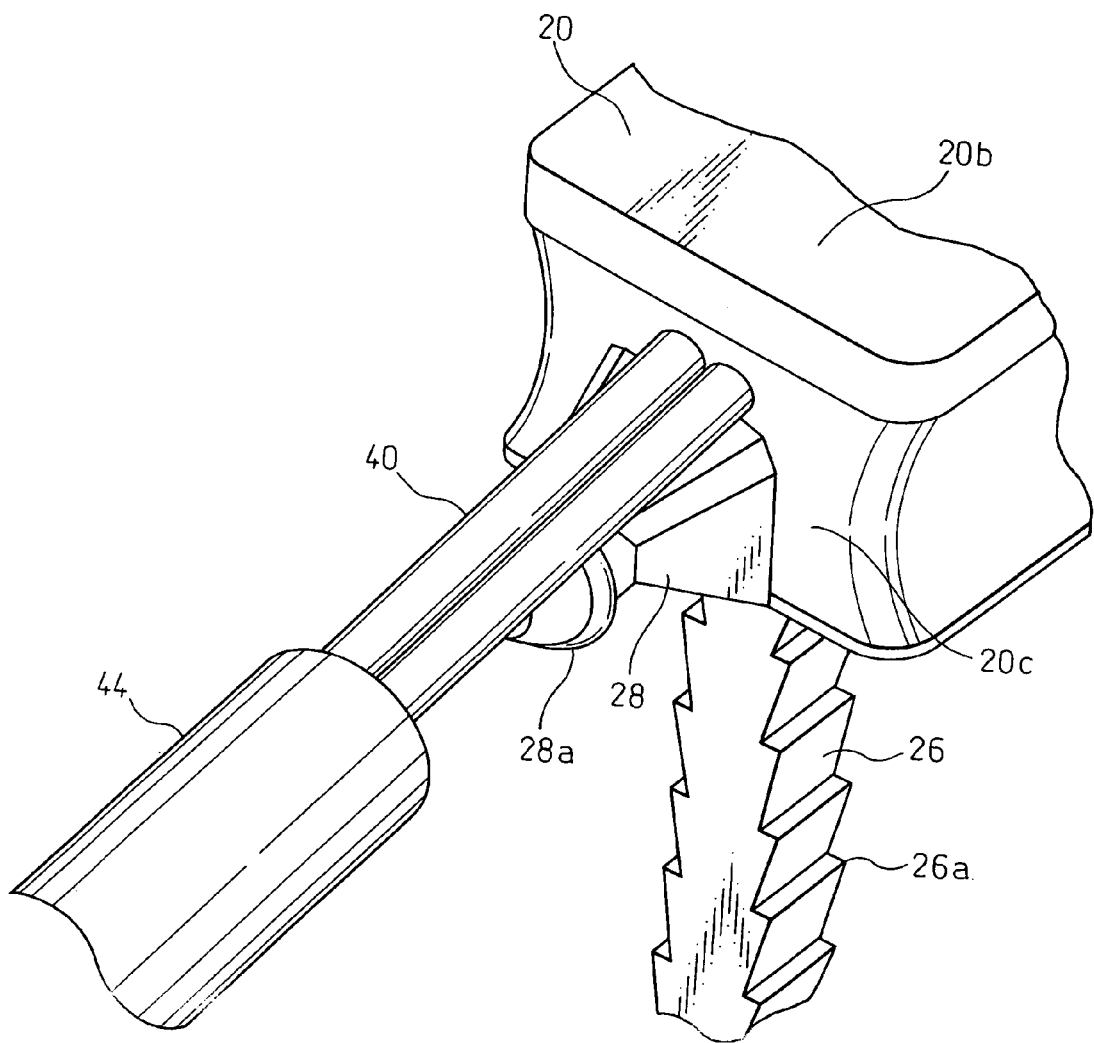

TEMPERATURE SENSOR CAPABLE OF AUTOMATIC INSTALLATION

CROSS REFERENCE TO RELATED APPLICATIONS

This application is a division of application Ser. No. 11/043,073 filed on Jan. 27, 2005 now U.S. Pat. No. 7,153,024, which is based on Japanese Patent Application No. 2004-20344 filed on Jan. 28, 2004 and Japanese Patent Application No. 2004-20345 filed on Jan. 28, 2004, the disclosures of which are incorporated herein by reference.

BACKGROUND OF THE INVENTION

1. Field of the Invention

The present invention relates to a sensor and, particularly, to a temperature sensor preferably used for sensing the temperature of an evaporator.

Moreover, the present invention relates to a sensor adapted to be formed by fixing a cylindrical metal case for accommodating a sensing element on a three-dimensional substrate and, particularly, to a temperature sensor adapted to be formed by installing an installation portion for mounting on an evaporator and a cylindrical metal case for accommodating a temperature sensing element on a three-dimensional substrate in a vertically standing state.

2. Description of the Related Art

In an air-conditioner for a vehicle, a temperature sensor is installed on an evaporator in order to measure the temperature of a refrigerant. The construction of the temperature sensor for an evaporator is explained with reference to FIGS. 12A to 12D. FIG. 12A is a plan view of an evaporator temperature sensing element 110, FIG. 12B is an elevation view from the arrow X12b in FIG. 12A, FIG. 12C is an elevation view from the arrow X12c in FIG. 12A, and FIG. 12D is a sectional view taken along the line X12d-X12d in FIG. 12C.

The evaporator temperature sensor 110 is formed as an insert molding with a resin, wherein an aluminum case 130 for accommodating a temperature sensing element 32 at the top end thereof and an installation portion 126 for mounting on an evaporator are installed on a substantially cubic substrate 120 in a standing state. Grooves 126a for preventing withdrawal are formed on the installation portion 126. A harness 40 connected to a signal wire 42 from the temperature sensing element passes through a vertical wall 120c of the substrate 120. The evaporator temperature sensor 110 is fabricated by accommodating the temperature sensing element 32 in the aluminum case 130, by placing the aluminum case 130 filled with filler 122 in a mold and by insert molding with a resin.

FIG. 13 shows a state in which the evaporator temperature sensor 110 is installed on an evaporator 50.

The evaporator temperature sensor 110 is installed by inserting the aluminum case 130 and the installation portion 126 into spaces between fins 52 of the evaporator 50.

In the patent documents 1 to 4, air-conditioners for a vehicle using an evaporator temperature sensor are disclosed.

[Patent Document 1]
Japanese Unexamined Patent Publication (Kokai) No. 2002-211,233
[Patent Document 2]
Japanese Unexamined Patent Publication (Kokai) No. 7-237,440
[Patent Document 3]
Japanese Unexamined Patent Publication (Kokai) No. 6-48,168
[Patent Document 4]
Japanese Unexamined Patent Publication (Kokai) No. 5-238,253

In the evaporator temperature sensors 110 of a prior art, however, as the harness 40 is not fixed to the substrate 120, the root portion of the harness 40 at which the harness 40 comes out from the substrate 120 is likely to be bent and is often broken and disconnected due to vibration during operation of a vehicle or the vibration of a compressor of an air-conditioner.

During the insert molding with a resin, however, as heat is exerted at around 250° C., the harness 40 is required to be made of a material having heat resistance higher than or equal to 250° C., and thereby, the cost of the evaporator temperature sensor is increased.

The evaporator temperature sensor may be installed on various positions in accordance with the type of a vehicle or air-conditioner casings. Due to this installation position, the harness is required to be long which makes it difficult to handle. In this configuration, during insert molding, if the harness is long, it is troublesome to set the harness into a mold and easy to insert the harness into the mold. On the other hand, in order to correspond to various installation positions, a plurality of harnesses having various lengths should be prepared, but it is difficult to combine these harnesses having various lengths together by insert molding. Therefore, the manufacturing process is difficult to automatically perform and is, instead, manually performed with resulting increase in the manufacturing cost.

On the other hand, if the harness 40 is not fixed to the substrate 120 by insert molding, the root portion of the harness 40 at which the harness 40 comes out from the substrate 120 is likely to be bent and may be broken and disconnected due to vibration during operation of a vehicle or the vibration of a compressor of an air-conditioner.

In addition, if the relative position of the harness 40 with respect to the evaporator temperature sensor 110 is not fixed, when the evaporator temperature sensor 110 is installed on the air-conditioner case, the bend of the harness 40 must be adjusted. Due to this, there is a problem in which it is difficult to automate the installation of the evaporator temperature sensor 110. The operation of installation is explained with reference to FIG. 13.

After the evaporator temperature sensor 110 is installed on the evaporator 50 accommodated in an air-conditioner case 60, the harness 40 is settled into a groove 64, lids 62A and 62B are closed and, thereby, the installation operation is finished. During the operation, if the position of the harness 40 is not fixed, the efficiency of the operation is lowered. Moreover, if the position of the harness 40 is not fixed, automatic assembling is difficult.

SUMMARY OF THE INVENTION

The present invention has been developed with the above-mentioned problems being taken into consideration, and the object thereof is to provide a sensor or a temperature sensor that has a harness of which the root portion has improved reliability.

Another object of the present invention is to provide a sensor or a temperature sensor capable of holding a cylindrical metal case thereof without using an insert molding.

In order to solve the above-mentioned problem, a sensor 10, according to a first aspect of the present invention, comprises: a sensing element 32 which is received near a top end of a cylindrical portion 30 mounted on a substrate 20 in a standing state; and a harness 40 from the sensing element 32 which comes out from the substrate 20; wherein a guide portion 28 extending from the substrate 20 along the harness 40 is provided; and wherein the harness 40 comes into contact with and is fixed to the guide portion 28 by accommodating the guide portion 28 and the harness 40 in a tube 44 which retains the harness 40.

A temperature sensor 10 according to a second aspect of the present invention comprises: a three-dimensional substrate 20 made of a resin and including an upper surface 20a, a lower surface 20b, a vertical wall 20c and a substantially rod-shaped guide portion 28 vertically protruding on the vertical wall 20c; an installation portion 26 for installing on a measured member 50 and vertically mounted on the upper surface 20a of the substrate 20 in a standing state; a cylindrical portion 30 receiving a temperature sensing element 32 near a top end thereof and vertically mounted on the upper surface 20a of the substrate 20 in a standing state; a harness 40 connected to the temperature sensing element 32 and coming out from the vertical wall 20c of the substrate 20 after passing through an inside of the cylindrical portion 30; and a tube 44 for fixing the harness 40 to the guide portion 28 in a contacting state by accommodating the guide portion 28 and the harness 40.

In a sensor 10 according to the first aspect, the guide portion 28 extending from the substrate 20 of the cylindrical portion 30 retaining a sensing element and along the harness 40 is provided, and the harness 40 comes into contact with and is fixed to the guide portion 28 by accommodating the guide portion 28 and the harness 40 in the tube 44. Because of this, a root portion of the harness 40 which comes out from the substrate 20 is unlikely to be bent due to the rigidity of the guide portion 28, and is seldom broken and disconnected. In addition, as the position of the harness 40 with respect to the sensor can be maintained constant, the harness 40 never acts as an obstruction, and it is possible to assemble the sensor 10 automatically.

In a temperature sensor 10 according to the second aspect, the substantially rod-shaped guide portion 28 vertically protruding on the vertical wall 20c of the substrate 20 is provided, and the guide portion 28 and the harness 40 are accommodated in the tube 44, so that the harness 40 is fixed to the guide portion 28 in a contacting state. Because of this, a root portion of the harness 40 which comes out from the substrate 20 is unlikely to be bent due to the rigidity of the guide portion 28, and is seldom broken and disconnected. In addition, as the position of the harness 40 with respect to the temperature sensor can be maintained constant, the harness 40 never acts as an obstruction, and it is possible to automatically assemble the temperature sensor 10.

According to a third aspect of the present invention, it is preferable that a rib 28a having an outer diameter greater than the inner diameter of the tube 44 is provided on the guide portion 28. By this configuration, the tube 44 is difficult to withdraw due to the resistance of the rib 28a. As a result, the root portion of the harness 40 which comes out from the substrate 20 is seldom broken and disconnected, by fixing the harness 40 on the guide portion 28 using the tube 44.

According to a fourth aspect of the present invention, as the guide portions 28A and 28B, which are made by dividing the guide portion 28 into two parts, sandwich and hold the harness, the harness 40 can be firmly fixed by the guide portion 28.

According to a fifth aspect of the present invention, as a ring-shaped groove 24 which is provided on the vertical wall 20c of the substrate 20 is made to accommodate a front end of the tube, the tube 44 is difficult to withdraw and, as a result, the root portion of the harness 40 which comes out from the substrate 20 is seldom broken and disconnected, by fixing the harness 40 on the guide portion 28 using the tube 44.

According to a sixth aspect of the present invention, as the installation portion 26, which is vertically mounted on the upper surface of the substrate 20 in a standing state, comprises return edges 26a acting as hooks for preventing the withdrawal, the return edge 26a engages with cooling fins of an evaporator by inserting the installation portion 26 between the cooling fins and it is possible to easily install the temperature sensor into the cooling fins of the evaporator.

According to a seventh aspect of the present invention, a sensor 210 comprising a cylindrical metal case 230 which receives an sensing element 232 in a top end thereof and is fixed on a three-dimensional substrate 220; wherein a flange portion 230a with an outer diameter enlarged near its opening 230c opposing to the top end of the cylindrical metal case 230 is provided, a through-hole 222a making the top end of the cylindrical metal case 230 insert and penetrate through an upper surface 220a of the substrate 220 is provided on the upper surface 220a of the substrate 220, a hollow portion 222c receiving the flange portion 230a of the cylindrical metal case 230 which communicates with the through-hole 222a is provided immediately below the through-hole 222a, and hook portions 222d protruding inside are provided immediately below the hollow portion 222c; and wherein the top end of the cylindrical metal case 230 is inserted through the through-hole 222a of the substrate 220, the hollow portion 222c of the substrate 220 receives the flange portion 230a of the cylindrical metal case 230, and the opening 230c of the cylindrical metal case 230 engages with the hook portions 222d, so that the cylindrical metal case 230 is fixed to the substrate 220.

According to an eighth aspect of the present invention, a temperature sensor comprises: a cylindrical metal case 230 receiving a temperature sensing element 232 in a top end thereof; and an installation portion for installing the temperature sensor to a measured member which is mounted on a three-dimensional substrate 220 in a vertically standing state; wherein a flange portion 230a with an outer diameter enlarged near its opening 230c opposing to the top end of the cylindrical metal case 30 is provided, a first through-hole 222a allowing the top end of the cylindrical metal case 230 to be vertically inserted and to penetrate through an upper surface 220a of the substrate 220 is provided on the upper surface 220a of the substrate 220, a hollow portion 222c receiving the flange portion 230a of the cylindrical metal case 230 which communicates with the first through-hole 222a is provided immediately below the first through-hole 222a, and a second through-hole 222e for inserting the cylindrical metal case 230 therethrough and hook portions 222d protruding to the inside of the second through-hole 222e are provided immediately below the hollow portion 222c; and wherein the top end of the cylindrical metal case 230 is inserted through the first through-hole 222a of the substrate 220, the hollow portion 222c of the substrate 220 receives the flange portion 230a of the cylindrical metal case 230, and the opening 230c of the cylindrical metal case 230 engages with the hook portions 222d, so that the cylindrical metal case 230 is fixed to the substrate 220.

In the seventh aspect of the present invention, the flange portion 230 with an outer diameter enlarged near its opening 230c opposing to the top end of the cylindrical metal case 230 is provided. On the other hand, the through-hole 222a allowing the cylindrical metal case 230 to be inserted and to penetrate through the upper surface 220a of the three-dimensional substrate 220 is provided on the upper surface 220a of the substrate 220, the hollow portion 222c receiving the flange portion 230a of the cylindrical metal case 230 which communicates with the through-hole 222a is provided immediately below the through-hole 222a, and the hook portions 222d protruding inside are provided immediately below the hollow portion 222c. The top end of the cylindrical metal case 230 is inserted through the through-hole 222a of the substrate 220, the hollow portion 222c of the substrate 220 receives the flange portion 230a of the cylindrical metal case 230, and the opening 230c of the cylindrical metal case 230 engages with the hook portions 222d, so that the cylindrical metal case 230 is fixed to the substrate 220. In other words, the cylindrical metal case 30 can be fixed by inserting it into the through-hole 222a of the substrate 220, so that the cylindrical metal case 230 can be fixed without performing an insert molding. Moreover, as the insert molding is not performed, the harness is not required to have heat resistance for withstanding the insert molding and it becomes possible to use a cheap harness which can be used in many applications.

In the temperature sensor 10 according to the eighth aspect, the flange portion 230a with an outer diameter enlarged near its opening 230c opposing to the top end of the cylindrical metal case 30 is provided. On the other hand, the first through-hole 222a allowing the cylindrical metal case 230 to be vertically inserted and to penetrate through the upper surface 220a of the three-dimensional substrate 220 is provided on the upper surface 220a of the substrate 220, the hollow portion 222c receiving the flange portion 230a of the cylindrical metal case 230, which communicates with the first through-hole 222a, is provided immediately below the first through-hole 222a, and the second through-hole 222e for inserting the cylindrical metal case 230 therethrough and the hook portions 222d protruding to the inside of the second through-hole 222e are provided immediately below the hollow portion 222c. Then, the top end of the cylindrical metal case 230 is inserted through the first through-hole 222a of the substrate 220, the hollow portion 222c of the substrate 220 receives the flange portion 230a of the cylindrical metal case 230, and the opening 230c of the cylindrical metal case 230 engages with the hook portions 222d, so that the cylindrical metal case 230 is fixed to the substrate 220. In other words, the cylindrical metal case 30 can be fixed by inserting it into the first through-hole 222a of the substrate 220, so that the cylindrical metal case 230 can be fixed without performing an insert molding. Moreover, as the insert molding is not performed, the harness is not required to have heat resistance for withstanding the insert molding and it becomes possible to use a cheap harness which can be used in many applications.

In a temperature sensor 10 according to a ninth aspect of the present invention, the opening 230c of the cylindrical metal case 230 is provided with a taper and the top end thereof is made sharp. Therefore, the opening 230c bites into the hook portions 222d integrally molded with the substrate 220 made of a resin, as a part thereof and the cylindrical metal case 230 can be firmly fixed to the substrate 220.

In a temperature sensor according to a tenth aspect of the present invention, the cylindrical metal case 230 can be firmly fixed to the substrate 220 using a pair of hook portions 222d for sandwiching and holding the cylindrical metal case 230. In addition, a pair of hook portions is provided in a direction perpendicular to a longitudinal direction of a groove 222f, for receiving the harness, located on the lower surface 220b of the substrate 220, that is, a further position from a receiving position (groove) where the harness is received. Because of this, the harness does not obstruct the hook portions 222d when it is installed and it is possible to easily install the cylindrical case 230 on the substrate 220.

According to an eleventh aspect of the present invention, a substantially rod-shaped guide portion 228 vertically protruding on a vertical wall of the substrate 220 is provided, the guide portion 228 and the harness 240 are received in a tube 244, so that the harness 240 is fixed to the guide portion 228 in a contacting state. That is, the harness 240 can be fixed to the substrate 220 without using insert molding.

Because of this, a root portion of the harness 40 which comes out from the substrate 20 is unlikely to be bent due to the rigidity of the guide portion 28, and is seldom broken and disconnected. In addition, as the position of the harness 40 with respect to the temperature sensor can be maintained constant, the harness 40 never acts as an obstruction, and it is possible to automatically assemble the temperature sensor 10.

According to a twelfth aspect of the present invention, a rib 228a having an outer diameter larger than the inner diameter of the tube 244 for preventing withdrawal of the tube is preferably provided on the guide portion 228.

By this configuration, the tube 244 is made difficult to withdraw due to the resistance of the rib 228a. As a result, the root portion of the harness 240 which comes out from the substrate 220 is seldom broken and disconnected, by fixing the harness 240 on the guide portion 228 using the tube 244.

According to a thirteenth aspect of the present invention, the guide portions 228A and 228B divided into two parts sandwich and hold the harness so that the harness 240 can be firmly fixed by the guide portion 228.

According to a fourteenth aspect of the present invention, a ring-shaped groove 224 provided on the vertical wall 220c of the substrate 220 is adapted to receive a front end of the tube 244, so that the tube 244 is difficult to withdraw and, as a result, the root portion of the harness 240 which comes out from the substrate 220 is seldom broken and disconnected, by fixing the harness 240 on the guide portion 228 using the tube 244.

The symbols in the parentheses attached to each means described above indicate a corresponding relationship with a specific means in the embodiments to be described later.

The present invention may be more fully understood from the description of the preferred embodiments of the invention set forth below, together with the accompanying drawings.

BRIEF DESCRIPTION OF THE DRAWINGS

In the drawings:

FIG. 1A is a plan view of an evaporator temperature sensor according to a first embodiment of the present invention.

FIG. 1B is an elevation view viewed from the X1b arrow in FIG. 1A.

FIG. 1C is an elevation view viewed from the X1c arrow in FIG. 1A.

FIG. 1D is an elevation view viewed from the X1d arrow in FIG. 1A.

FIG. 1E is an elevation view showing a guide portion according to a variant of the first embodiment.

FIG. 1F is an enlarged drawing in which a rib 28a in FIG. 1D is shown in an enlarged state.

FIG. 2 is a perspective view showing important parts of an evaporator temperature sensor according to the first embodiment of the present invention.

DESCRIPTION OF THE PREFERRED EMBODIMENTS

First Embodiment

Figure 3:
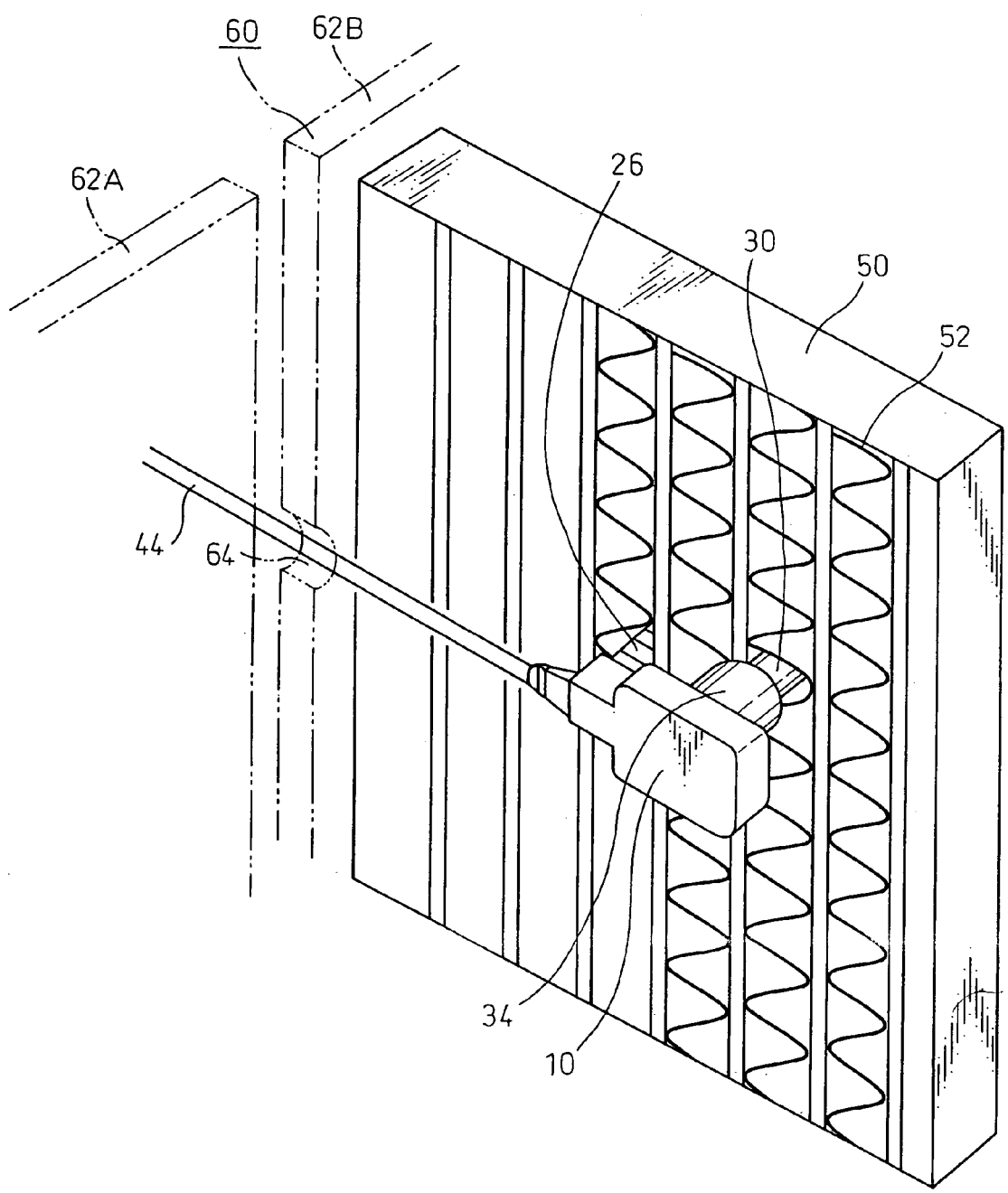
FIG. 3 is a perspective view showing the evaporator temperature sensor according to the first embodiment of the present invention which is installed on an evaporator.

A first embodiment, in which a temperature sensor of the present invention is applied to an evaporator temperature sensor, is explained with reference to FIGS. 1 to 3. FIG. 1A is a plan view of an evaporator temperature sensor according to the first embodiment of the present invention, FIG. 1B is an elevation view from the arrow X1b in FIG. 1A, FIG. 1C is an elevation view from the arrow X1c in FIG. 1A, and FIG. 1D is an elevation view from the arrow X1d in FIG. 1A.

An evaporator temperature sensor 10, as shown in FIG. 1B, comprises: a three-dimensional substrate 20 including an upper surface 20a, a lower surface 20b and a vertical wall 20c; an installation portion 26 for installing the evaporator temperature sensor on an evaporator 50 which vertically stands on the upper surface 20a of the substrate 20; and a cylindrical portion 30 which vertically stands on the upper surface 20a of the substrate 20. The substrate 20 has a form in which two, large and small, rectangular prisms, of which the surfaces are suitably finished respectively, are connected to each other, as shown in FIG. 1A. The cylindrical portion 30 comprises an aluminum case.

The installation portion 26 has a sharp top end and is provided with return edges 26a acting as hooks on the side surfaces thereof (refer to FIG. 1D). The cylindrical portion 30 is formed in a cylindrical shape having a sharp top end, on an upper surface of a cylindrical boss 34 having a circular columnar shape vertically protruding on the upper surface 20a of the substrate 20. A temperature sensing element 32 is accommodated near the top end of the cylindrical portion 30. A harness 40 extending from the temperature sensing element 32 comes out from the vertical wall 20c of the substrate 20 after passing Through the inside of the cylindrical portion 30.

A substantially rod-shaped guide portion 28 which vertically protrudes from the vertical wall 20c is provided along the harness 40. The guide portion 28 comprises: a first taper portion 28b which has an upper taper surface and side taper surfaces tapering from the vertical wall 20c; an extending portion 28c extending in the diameter same as that of the front end of the first taper portion 28b; a rib 28a having a diameter larger than that formed on the front end of the extending portion 28c; a second taper portion 28d which has an upper taper surface and side taper surfaces tapering from the front end of the rib 28a; and a front end 28e which is a vertical surface provided on the front end of the second taper portion 28d. In this embodiment, the guide portion 28 has a flat bottom surface as shown in FIG. 1D, but the guide portion 28 may be provided with a recess 28f for receiving the harness 40 on the bottom surface of the guide portion 28, as in a variant example shown in FIG. 1E. The substrate 20, the installation portion 26, the cylindrical portion 30, the cylindrical boss 34 and the guide portion 28, described above, are integrally formed with a resin by insert molding and then the cylindrical portion 30 comprising an aluminum case is installed on the substrate 20 in a standing state.

The guide portion 28 and the harness 40 are accommodated in an end of a vinyl tube 44 for protecting the harness. The state of the vinyl tube 44 in which the guide portion 28 is not accommodated yet is shown in FIG. 2 (viewed from the X2 arrow direction in FIG. 1B). The harness 40 is fixed to the guide portion 28 by accommodating them in the vinyl tube 44 so that the harness 40 comes into contact with the guide portion 28.

The rib 28a in FIG. 1D is shown in FIG. 1F as an enlarged view. The size of the rib 28a is decided and acts as a stopper for preventing the withdrawal of the vinyl tube 44. In other words, if the semi-circular outer periphery without a bottom surface of the rib 28a is D1, the distance from the edge P2 of the rib 28a to the intersecting point P3 of the tangent line with the left harness 40 in the figure from the edge P2 is D2, the outer peripheral distance of the left harness 40 from the point P3 to the intersecting point P4 of the tangent line between the left harness and the right harness in the figure is D3, the distance between the intersecting points P4 and P5 of the tangent line between the left harness and the right harness in the figure is D4, the outer peripheral distance of the right harness 40 from the point P5 to the intersecting point P6 of the tangent line from the edge P1 of the rib 28a is D5, and the distance from the intersecting point P6 of the tangent line to the edge P1 of the rib 28a is D6, the rib 28a is formed so that D1+D2+D3+D4+D5+D6 is larger than the inner diameter of the vinyl tube 44. The first taper portion 28b of the guide portion 28 has a front end the diameter of which is smaller than the outer diameter of the rib 28a and has a root end the diameter of which is larger than the outer diameter of the rib 28a, as shown in FIG. 1B.

The installation operation of the evaporator temperature sensor 10 of the first embodiment to the evaporator 50 will be described below with reference to FIG. 3.

The evaporator temperature sensor 10 is installed by inserting the installation portion 26 and the cylindrical portion 30 into spaces between the fins 52 of the evaporator 50 in a predetermined position and the evaporator 50 is accommodated in the air-conditioner case 60. As the evaporator temperature sensor 10 is installed in a predetermined position, the vinyl tube 44 accommodating the harness is received in the groove 64. Then, the operation is completed by closing the lids 62A and 62B. In the first embodiment, the position of the vinyl tube 44 (harness 40) is decided by deciding the position of the evaporator temperature sensor 10 and, therefore, the assembling of the evaporator temperature sensor 10 into the air-conditioner case 60 can be automatically carried out.

In the evaporator temperature sensor 10 of the first embodiment, the guide portion 28 with a substantially rod-like shape, which protrudes vertically, is provided on the vertical wall 20c of the substrate 20 and the guide portion 28 and the harness 40 are accommodated in the vinyl tube 44, so that the harness 40 comes into contact with and is fixed on the guide portion 28 of the harness 40. Therefore, the root portion of the harness 40 at which the harness 40 comes out from the substrate 20 becomes difficult to bend due to the rigidity of the guide portion 28 and the harness 40 is seldom broken and disconnected due to the vibration of an engine, a compressor of an air-conditioner, or the like. In addition, as the position of the harness 40 with respect to the evaporator temperature sensor 10 is kept constant, the harness 40 does not act as an obstruction and the assembling of the evaporator temperature sensor 10 can be automatically carried out. In the first embodiment, as the installation portion 26 comprises return edges 26a acting as hooks for preventing the withdrawal thereof, the return edge 26a is engaged with the cooling fins by inserting the installation portion 26 into a space between the cooling fins of the evaporator and the evaporator temperature sensor 10 can be easily installed between the cooling fins 52 of the evaporator 50.

The rib 28a which has an outer diameter larger than an inner diameter of the vinyl tube 44 is provided in the guide portion 28, so that the vinyl tube 44 is hard to withdraw due to the resistance of the rib 28a. As the harness 40 is fixed to the guide portion 28 using the vinyl tube 44, the root portion of the harness 40 at which the harness 40 comes out from the substrate 20 is seldom broken and disconnected.

The position where the evaporator temperature sensor is installed on the evaporator differs according to the type of the evaporator, the shape of the air-conditioner case, etc. In the evaporator temperature sensor 10 of the first embodiment, however, as it is possible to install it at various positions by changing the length of the vinyl tube 44, the evaporator temperature sensor 10 can be used in many applications.

Second Embodiment

Figure 4A:
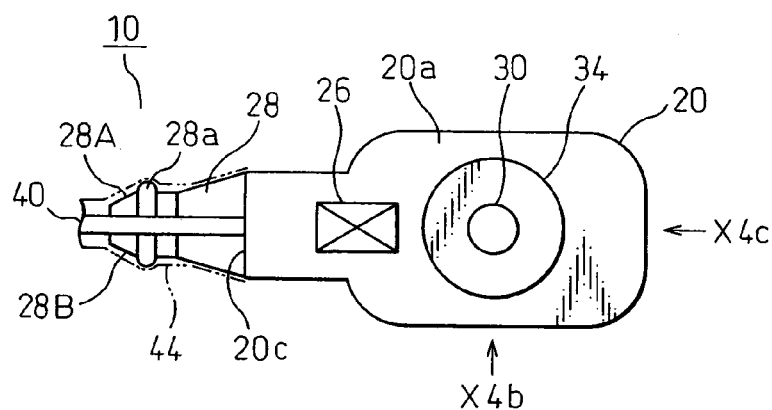
FIG. 4A is a plan view of an evaporator temperature sensor according to a second embodiment of the present invention.

The evaporator temperature sensor 10 according to a second embodiment of the present invention will be described below with reference to FIG. 4. FIG. 4A is a plan view of the evaporator temperature sensor according to the second embodiment, FIG. 4B is an elevation view from the X4b arrow in FIG. 4A, and FIG. 4C is an elevation view from the X4c arrow in FIG. 4A.

The evaporator temperature sensor 10 of the second embodiment is the same as that of the first embodiment except the construction of the guide portion 28 and, therefore, only the guide portion 28 is explained herein. In the first embodiment, the guide portion 28 is formed in a rod-like shape but in the second embodiment, as shown in FIG. 4A, the guide portion 28 comprises two rod-like guide members 28A and 28B and has a construction in which the harness 40 is sandwiched between the guide members 28A and 28B and is supported thereby.

Figure 4B:
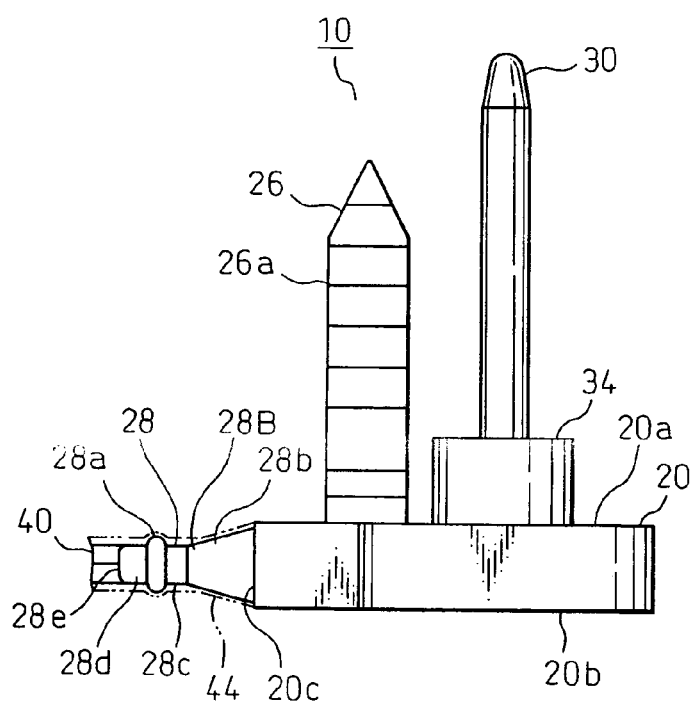
FIG. 4B is an elevation view viewed from the X4b arrow in FIG. 4A.
Figure 4C:
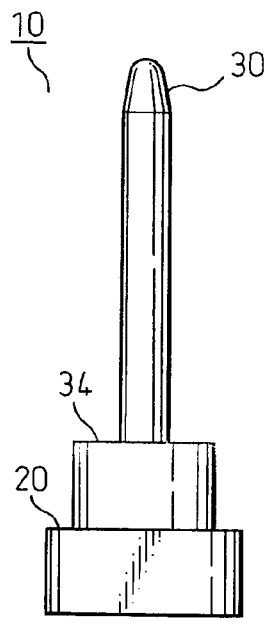
FIG. 4C is an elevation view viewed from the X4c arrow in FIG. 4A.

The guide member 28B at one side of the harness 40, as shown in FIG. 4B, comprises: a first taper portion 28b which has an upper taper surface, a lower taper surface and side taper surfaces tapering from a vertical wall 20c; an extending portion 28c extending in the diameter the same as that of the front end of the first taper portion 28b; a rib 28a having an outer diameter larger than that formed on the front end of the extending portion 28c; a second taper portion 28d which has side taper surfaces tapering from the front end of the rib 28a; and a front end 28e which is a vertical surface provided on the front end of the second taper portion 28d. The sizes of the rib 28a and the first taper portion 28b are decided to act as a stopper for preventing the withdrawal of the vinyl tube 44 as in the first embodiment.

According to the evaporator temperature sensor 10 of the second embodiment, as the harness 40 is sandwiched between and is supported by the guide members 28A and 28B, the guide portion 28 can fix the harness 40 more firmly.

Third Embodiment

Figure 5A:
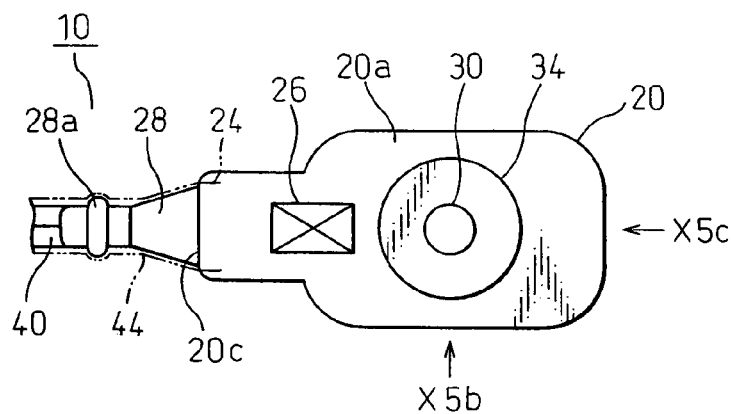
FIG. 5A is a plan view of an evaporator temperature sensor according to a third embodiment of the present invention.
Figure 5B:
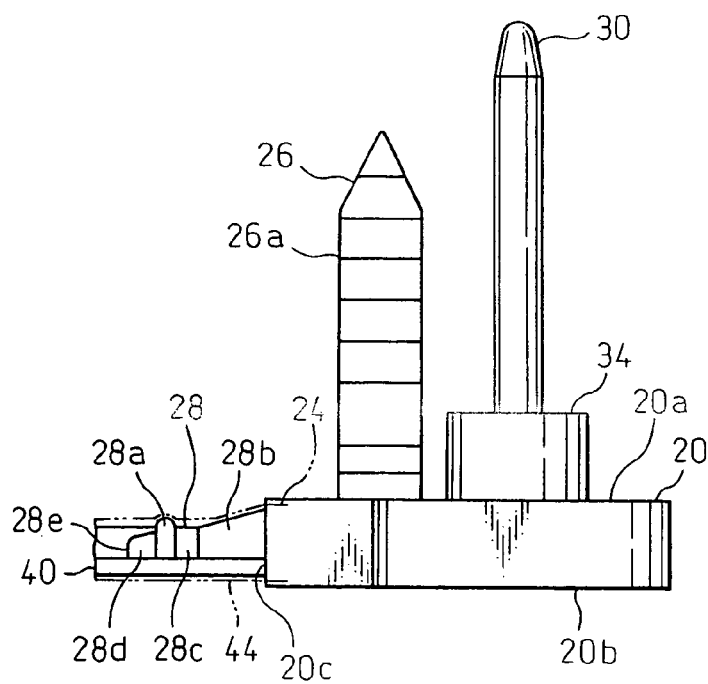
FIG. 5B is an elevation view viewed from the X5b arrow in FIG. 5A.
Figure 5C:
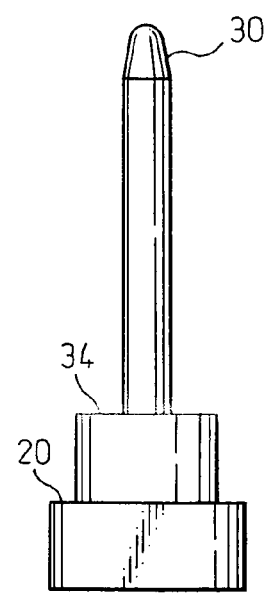
FIG. 5C is an elevation view viewed from the X5c arrow in FIG. 5A.

An evaporator temperature sensor 10 according to a third embodiment of the present invention will be described below with reference to FIGS. 5A to 5C. FIG. 5A is a plan view of the evaporator temperature sensor according to the third embodiment, FIG. 5B is an elevation view from the X5b arrow in FIG. 5A, and FIG. 5C is an elevation view from the X5c arrow in FIG. 5A.

The evaporator temperature sensor 10 of the third embodiment comprises a ring-like groove 24 for receiving the front end of the vinyl tube 44 in a vertical wall 20c of the substrate 20. The other construction of the evaporator temperature sensor 10 of the third embodiment is the same as that of the first embodiment.

In the third embodiment, the top end of the vinyl tube 44 is received in the ring-like groove 24 of the vertical wall 20c of the substrate 20, so that the vinyl tube 44 is hard to withdraw. As the harness 40 is fixed to the guide portion 28 using the vinyl tube 44, the root portion of the harness 40 at which the harness 40 comes out from the substrate 20 is not broken and disconnected.

In the third embodiment, the guide portion 28 has the same construction as that of the first embodiment, but the groove of the third embodiment may, of course, be applied to the construction of the guide portion 28 of the second embodiment.

Fourth Embodiment

A fourth embodiment in which a temperature sensor of the present invention is applied to an evaporator temperature sensor will be described below with reference to FIGS. 6A to 6D and FIGS. 7A to 7D.

Figure 6A:
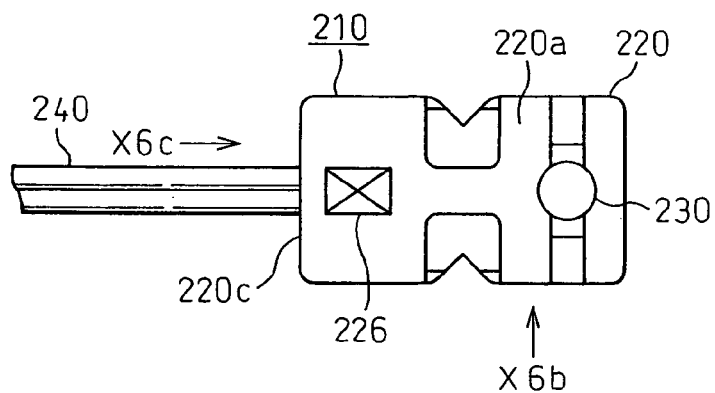
FIG. 6A is a plan view of an evaporator temperature sensor according to a fourth embodiment of the present invention.
Figure 6B:
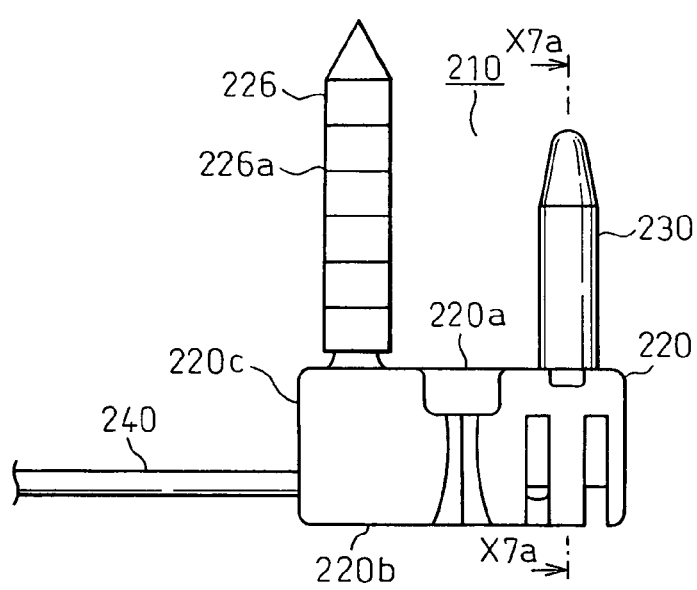
FIG. 6B is an elevation view viewed from the X6b arrow in FIG. 6A.
Figure 6C:
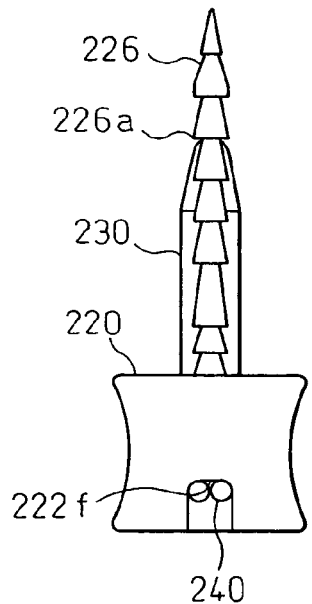
FIG. 6C is an elevation view viewed from the X6c arrow in FIG. 6A.
Figure 6D:
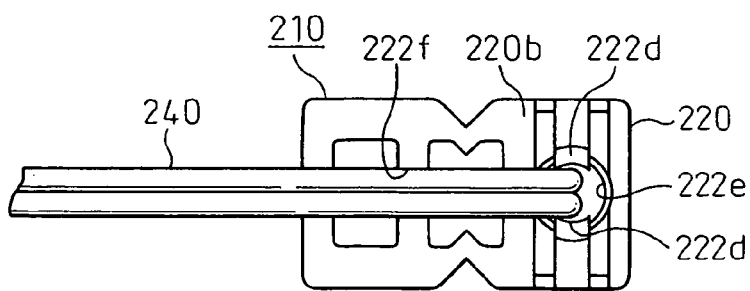
FIG. 6D is a bottom plan view of the evaporator temperature sensor according to the fourth embodiment.

FIG. 6A is a plan view of the evaporator temperature sensor according to the fourth embodiment of the present invention, FIG. 6B is an elevation view from the X6b arrow in FIG. 6A, FIG. 6C is an elevation view from the X6c arrow in FIG. 6A and FIG. 6D is an bottom plan view thereof.

An evaporator temperature sensor 210, as shown in FIG. 6B, comprises: a substantially cubic substrate 220 including an upper surface 220a, a lower surface 220b and a vertical wall 220c; an installation portion 226 for installing on an evaporator 250 which vertically stands on the upper surface 220a of the substrate 220; and an aluminum case 230 which vertically stands on the upper surface 220a of the substrate 220. The installation portion 226 is sharp at its top end and is provided with return edges 226a on its side surfaces (refer to FIG. 6C).

Figure 7A:
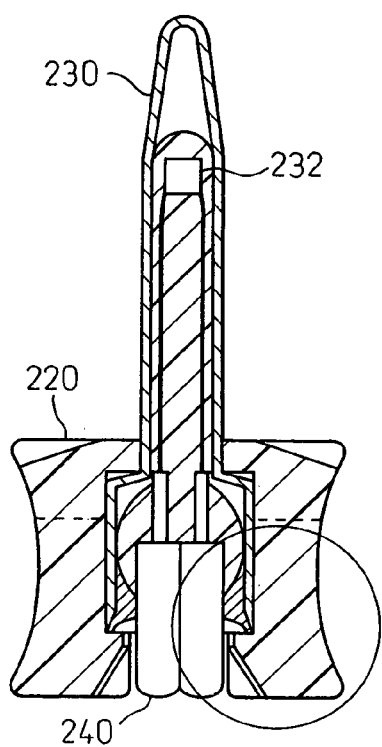
FIG. 7A is a sectional view of an evaporator temperature sensor along the line X7a-X7a in FIG. 6B.
Figure 7B:
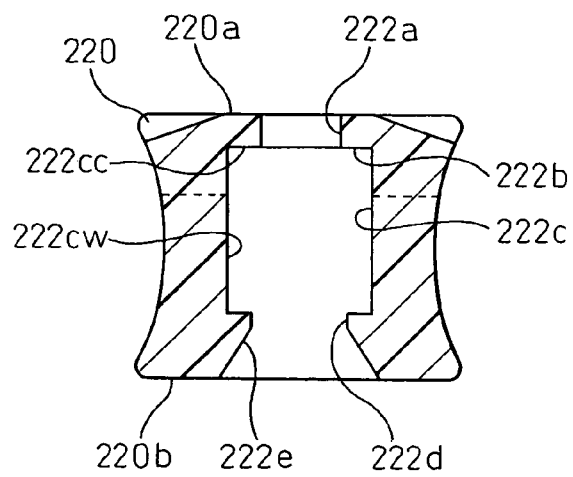
FIG. 7B is a sectional view showing a substrate in FIG. 7A.
Figure 7C:
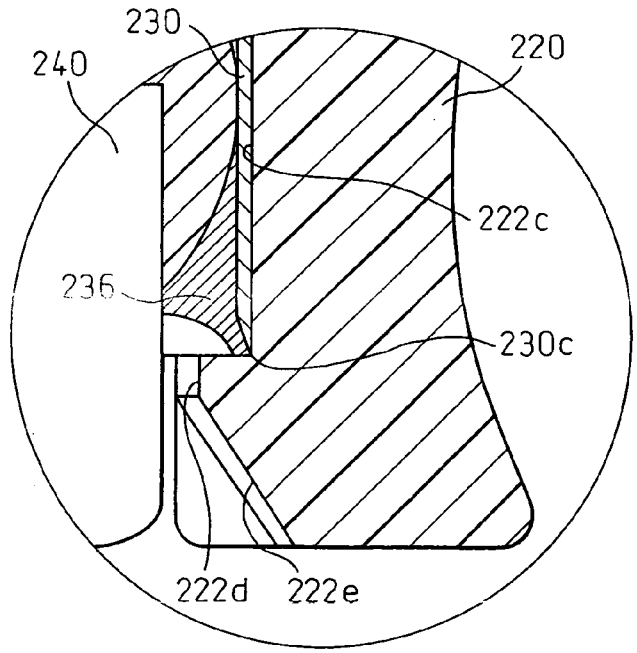
FIG. 7C is a sectional view showing an aluminum case in FIG. 7A.
Figure 7D:
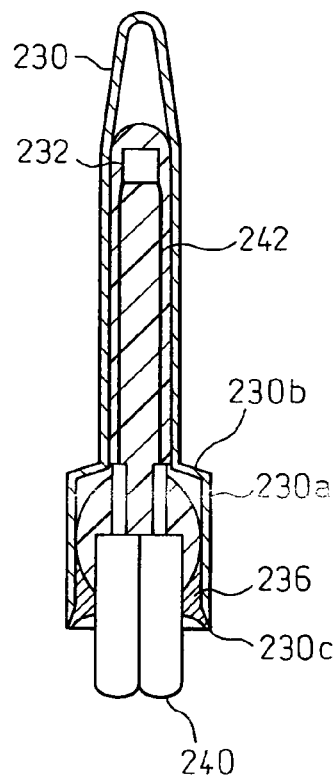
FIG. 7D is an enlarged drawing showing a part surrounded by a circle in FIG. 7A.

FIG. 7A is a sectional view along the line X7a-X7a of the evaporator temperature sensor 210 shown in FIG. 6B, FIG. 7B is a sectional view showing the substrate 220 in FIG. 7A, FIG. 7C is a sectional view showing the aluminum case 230 in FIG. 7A, and FIG. 7D is an enlarged view of the portion surrounded by a circular line in FIG. 7A. The aluminum case 230, as shown in FIG. 7C, is formed in a bag-like shape having an opening 230c at its lower end, has a flange portion 230a having a diameter larger than the top end side thereof, on the upper portion of the opening 230c, and has a step portion 230b having a crank-like section at the upper side of the flange portion 230a. A temperature sensing element 232 is installed near the top end of the aluminum case 230 and is connected to the exterior from the opening 230c via a signal wire 242 and a harness 240. Fillers 236 are filled in the aluminum case 230.

The substrate 220, as shown in FIG. 7B, is provided with a first through-hole 222a, through which the aluminum case 230 penetrates vertically with respect to an upper surface 220a of the substrate 220, on the upper surface 220a thereof. The substrate 220 is also provided with a hollow portion 222c, for receiving the flange portion 230a of the aluminum case 230, which communicates with the first through-hole 222a immediately above. The hollow portion 222c is a cylindrical space corresponding to the flange portion 230a and comprises a right wall 222cw and an end contacting portion 222cc including a flat surface coming into contact with the step portion 230b. Immediately below the hollow portion 222c, a second through-hole 222e for the aluminum case 230 to penetrate therethrough and hook portions 222d having a hook-like shape and protruding to the inside of the second through-hole 222e are provided. A pair of the hook portions 222d is provided so that they extend in a direction toward the center of the second through-hole 222e, as shown in FIG. 6D. In the fourth embodiment, a pair of the hook portions is provided, but the number of the hook portions may be one or more than three.

A groove portion 222f for receiving the harness 240 is formed on a lower surface 222b of the substrate 220 along the longitudinal direction of the substrate 220, as shown FIGS. 6D and 6C.

In installing an aluminum case 230 shown in FIG. 7C into the substrate 220 shown in FIG. 7B, the top end of the aluminum case 230 is penetrated through the first through-hole 222a of the substrate 220, the flange portion 230a of the aluminum case 230 is received in the hollow portion 222c of the substrate 220 and the step portion 230b is come into contact with the end contacting portion 222cc, so that the position of the aluminum case 230 is fixed. In this condition, the opening 230c of the aluminum case 230 is engaged with the hook portions 222d in order to fix the aluminum case 230 in the substrate 220. In other words, as the aluminum case 230 can be fixed by being inserted into the first through-hole 222a of the substrate 220, the aluminum case 230 can be fixed into the substrate 220 without using the insert molding. Further, as the insert molding is not carried out, the harness is not required to have a heat resistance capable of enduring the insert molding, so that a harness which is used in many applications, and is not expensive, can be used.

In addition, in order not to use the insert molding, an aluminum case 230 attached with a harness 240 with various lengths can be easily assembled with the substrate 220. Due to this, an aluminum case 230 comprising a harness 240 with various lengths, especially with a long length, can also be automatically assembled with the substrate 220.

As shown in FIG. 7D which is an enlarged view of a part surrounded by a circle in FIG. 7A, the opening 230c of the aluminum case 230 is tapered and is sharp at its top end. Therefore, the opening 230c bites into the hook portions 222d integrally formed with the substrate 220, as a part thereof, using a resin and can fix the aluminum case 230 on the substrate 220 at retaining strength of the similar level as that of the insert molding.

In a fourth embodiment, as shown in FIG. 6D, as the aluminum case 230 is sandwiched and supported by a pair of hook portions 222d, the aluminum case 230 can be firmly fixed to the substrate 220. Moreover, the hook portions 222d are provided on positions in the longitudinal direction and the perpendicular direction of the groove 222f, for receiving the harness 240, located in the lower surface 220b of the substrate 220, i.e. the further positions from the received position (groove) of the harness 240. Therefore, the harness 240 hardly obstructs the hook portions 222d during installation, so that the aluminum case 230 can be easily installed on the substrate 220.

In the evaporator temperature sensor 210 of the fourth embodiment, as aluminum which is a good conductor of heat, is used for the aluminum case 230, the temperature of the evaporator 250 can be transferred to the temperature sensing element 232 in a short time.

Fifth Embodiment

An evaporator temperature sensor 210 according to a fifth embodiment of the present invention will be described below with reference to FIGS. 8A to 8D and FIG. 9.

Figure 8A:
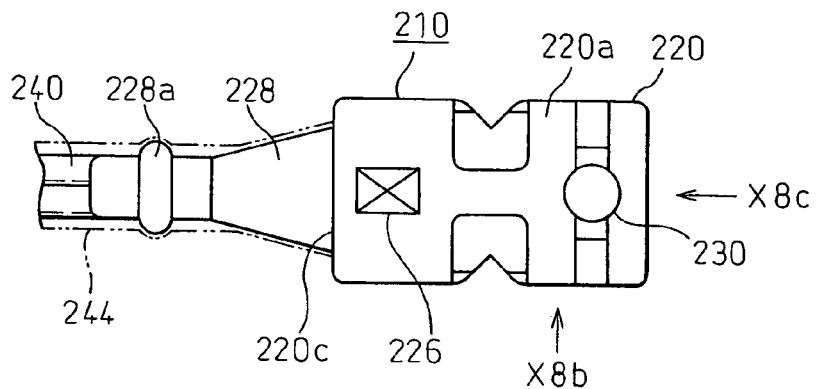
FIG. 8A is a plan view of an evaporator temperature sensor according to a first variant of a fifth embodiment of the present invention.
Figure 8B:
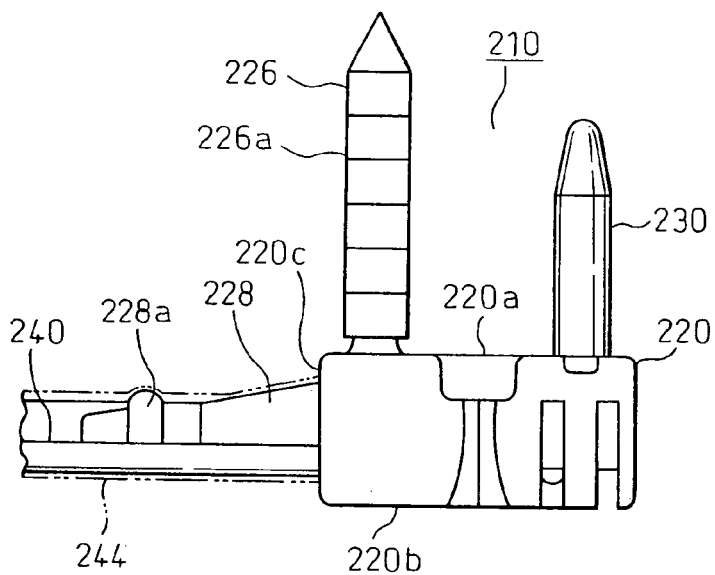
FIG. 8B is an elevation view viewed from the X8b arrow in FIG. 8A.
Figure 8C:
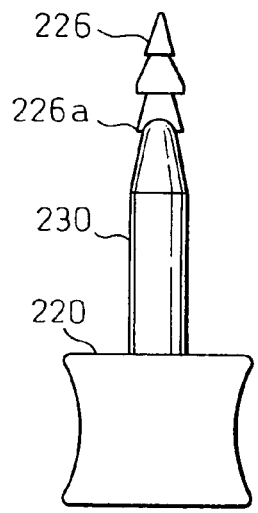
FIG. 8C is an elevation view viewed from the X8c arrow in FIG. 8A.
Figure 8D:
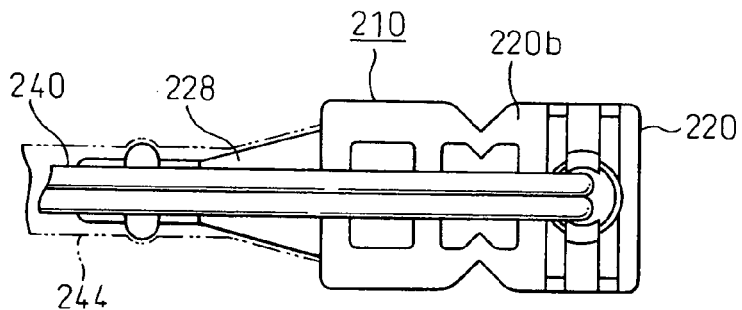
FIG. 8D is a bottom plan view of the evaporator temperature sensor according to the first variant of the fifth embodiment.

FIG. 8A is a plan view of the evaporator temperature sensor according to the fifth embodiment of the present invention, FIG. 8B is an elevation view from the X8b arrow in FIG. 8A, FIG. 8C is an elevation view from the X8c arrow in FIG. 8A and FIG. 8D is a bottom plan view thereof.

An evaporator temperature sensor 210 of the fifth embodiment is similar to that of the fourth embodiment described above with reference to FIGS. 6A to 6D and FIGS. 7A to 7D. However, in the fifth embodiment, a substantially rod-shaped guide portion 228 is provided which protrudes perpendicularly on a vertical wall 220c along a harness 240. A rib 228a having an outer diameter larger than the inner diameter of a vinyl tube 244 is provided at a substantially center position of the guide portion 228.

The guide portion 228 and the harness 240 are accommodated in the end of the vinyl tube 244 for protecting the harness. In this configuration, the harness 240 is fixed to the guide portion 228 in a contacting state by being accommodated in the vinyl tube 244. The size of the rib 228a is determined so as to act as a stopper of the vinyl tube 244 for preventing the withdrawal thereof.

Figure 9:
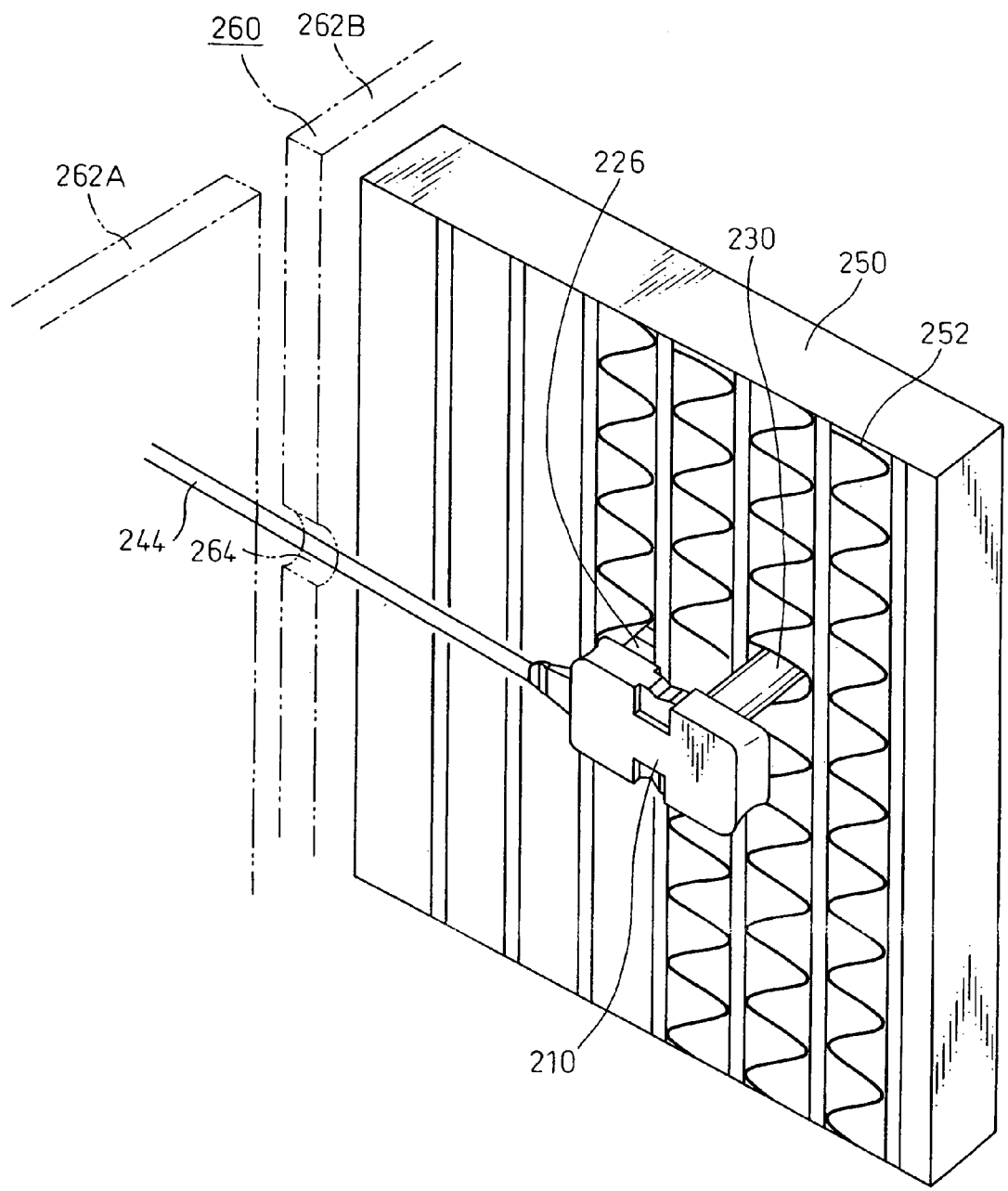
FIG. 9 is a perspective view showing the evaporator temperature sensor according to the first variant of the fifth embodiment of the present invention which is installed on an evaporator.

The installation operation of the evaporator temperature sensor 210 of the fifth embodiment to the evaporator 250 will be described below with reference to FIG. 9.

The evaporator temperature sensor 210 is installed by inserting the installation portion 226 and the aluminum case 230 into spaces between the fins 252 of the evaporator 250 in predetermined positions and the evaporator 250 is accommodated in the air-conditioner case 260. As the evaporator temperature sensor 210 is installed in a predetermined position, the vinyl tube 244 accommodating the harness is received in a groove 264. Then, the operation is completed by closing lids 262A and 262B. In the fifth embodiment, the position of the vinyl tube 244 (harness) is decided by deciding the position of the evaporator temperature sensor 210 and, therefore, the assembling of the evaporator temperature sensor 210 into the air-conditioner case 260 can be automatically carried out.

In the evaporator temperature sensor 210 of the fifth embodiment, the guide portion 228 with a substantially rod-like shape, which protrudes vertically, is provided on the vertical wall 220c of the substrate 220 and the guide portion 228 and the harness 240 are accommodated in the vinyl tube 244, so that the harness 240 comes into contact with and is fixed on the guide portion 228.

In other words, the harness 240 can be fixed on the substrate 220 by assembling and is not fixed by the insert molding. Therefore, the root portion of the harness 240 at which the harness 240 comes out from the substrate 220 becomes difficult to bend due to the rigidity of the guide portion 228 and is seldom broken and disconnected due to the vibration of an engine, a compressor of an air-conditioner, or the like. In addition, as the position of the harness 240 with respect to the evaporator temperature sensor 210 is kept constant, the harness 240 does not act as an obstruction and the assembling of the evaporator temperature sensor 210 can be automatically carried out. In the fifth embodiment, as the installation portion 226 has return edges 226a for preventing withdrawal, the return edge 226a is engaged by inserting the installation portion 226 into a space between the cooling fins of the evaporator and the evaporator temperature sensor 210 can be easily installed onto the cooling fins 252 of the evaporator 250.

The rib 228a which has an outer diameter larger than an inner diameter of the vinyl tube 244 is provided in the guide portion 228, so that the vinyl tube 244 is hard to withdraw due to the resistance of the rib 228a. As the harness 240 is fixed to the guide portion 228 using the vinyl tube 244, the root portion of the harness 240 at which the harness 240 comes out from the substrate 220 is not broken and disconnected.

The position where the evaporator temperature sensor is installed on the evaporator differs according to the type of the evaporator, the shape of the air-conditioner case, etc. In the evaporator temperature sensor 210 of the fifth embodiment, however, as it is possible to install it at various positions by changing the length of the vinyl tube 244, the evaporator temperature sensor 210 can be used in many applications.

First Variant of the Fifth Embodiment

An evaporator temperature sensor 210 according to a first variant of the fifth embodiment will be described below with reference to FIGS. 10A to 10D and FIG. 9.

Figure 10A:
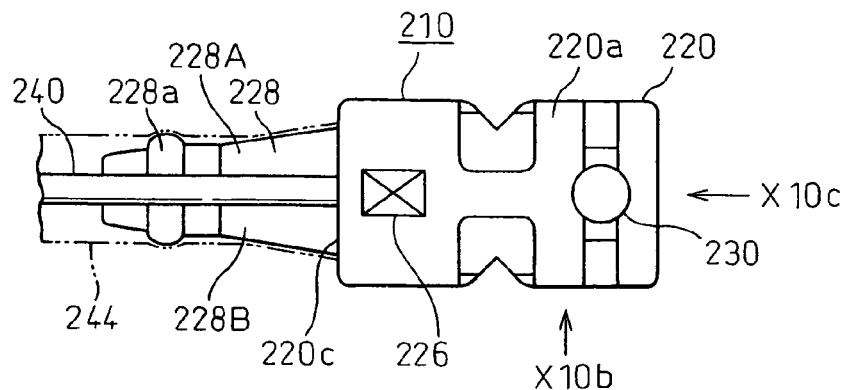
FIG. 10A is a plan view of an evaporator temperature sensor according to a first example of the first variant of the fifth embodiment of the present invention.
Figure 10B:
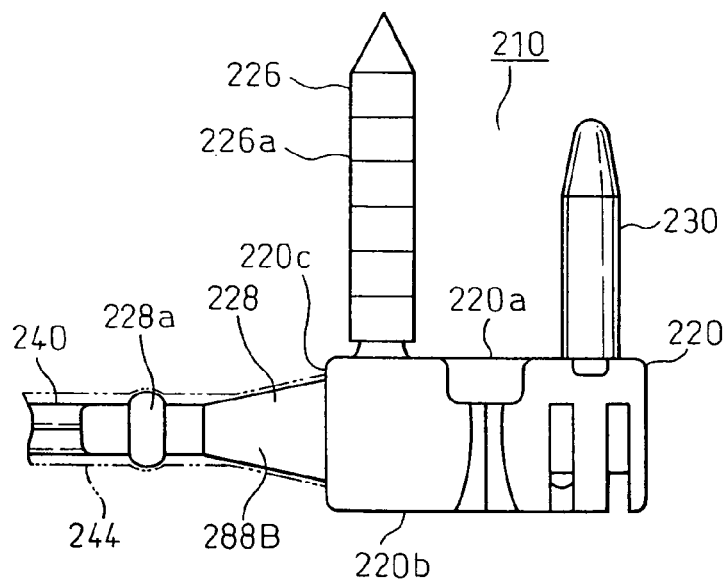
FIG. 10B is an elevation view viewed from the X10b arrow in FIG. 10A.
Figure 10C:
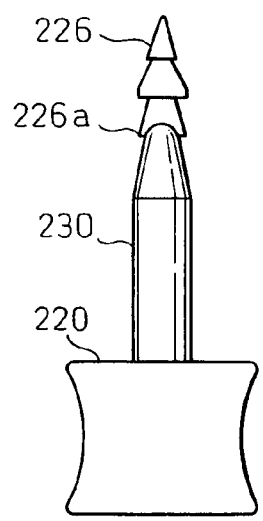
FIG. 10C is an elevation view viewed from the X10c arrow in FIG. 10A.
Figure 10D:
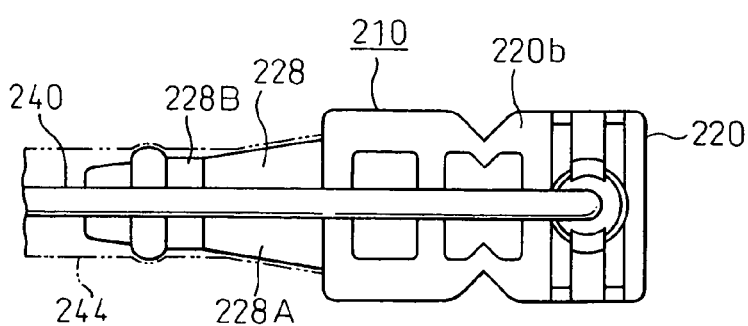
FIG. 10D is a bottom plan view of the evaporator temperature sensor according to the first example of the first variant of the fifth embodiment.

FIG. 10A is a plan view of the evaporator temperature sensor according to the first variant of the fifth embodiment, FIG. 10B is an elevation view from the X10b arrow in FIG. 10A, FIG. 10C is an elevation view from the X10c arrow in FIG. 10A and FIG. 10D is a bottom plan view thereof.

An evaporator temperature sensor 210 of the first variant of the fifth embodiment is similar to that of the fifth embodiment except the construction of the guide portion 228, so that only the guide portion 228 is explained. Though, in the fifth embodiment, the guide portion 228 is formed in a rod-like shape, in the first variant of the fifth embodiment, as shown in FIG. 10A, the guide portion 228 is formed by two rod-shaped guide members 228A and 228B, and the harness 240 is sandwiched and is supported between the guide members 228A and 228B.

In the guide member 228B at one side, a rib 228a having an outer diameter larger than that of the guide member 228B is provided at a substantially center position of the guide portion 228, as shown in FIG. 10B.

In the evaporator temperature sensor 210 of the first variant of the fifth embodiment, as the harness 240 is sandwiched and supported by the guide members 228A and 228B, the harness 240 can be more firmly fixed by the guide portion 228.

Second Variant of the Fifth Embodiment

An evaporator temperature sensor 210 according to a second variant of the fifth embodiment will be described below with reference to FIGS. 11A to 11D.

Figure 11A:
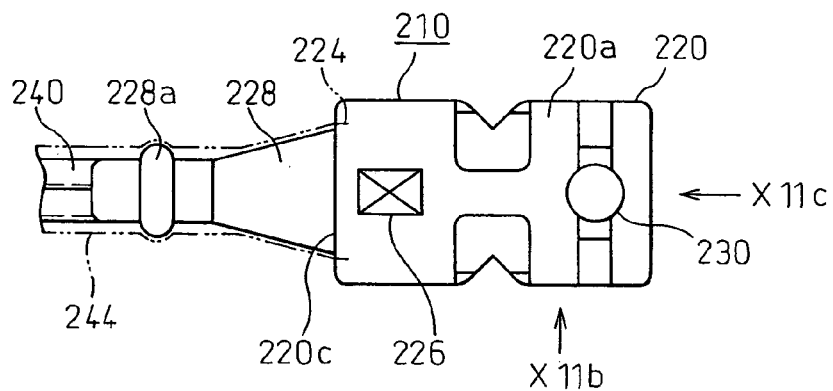
FIG. 11A is a plan view of an evaporator temperature sensor according to a second variant of the fifth embodiment of the present invention.
Figure 11B:
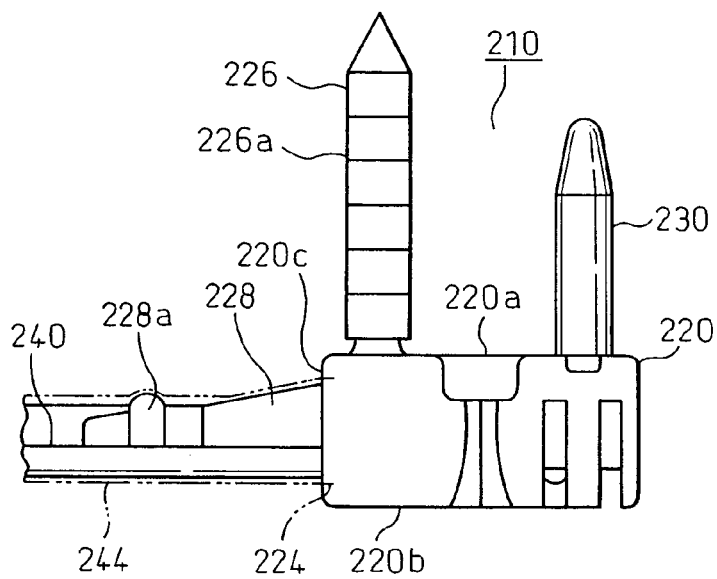
FIG. 11B is an elevation view viewed from the X11b arrow in FIG. 11A.
Figure 11C:
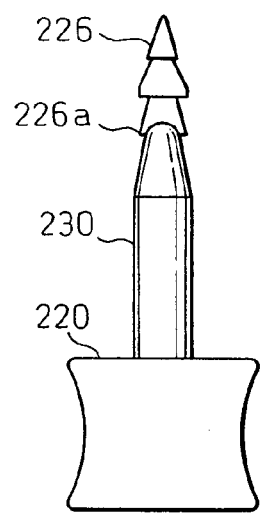
FIG. 11C is an elevation view viewed from the X11c arrow in FIG. 11A.
Figure 11D:
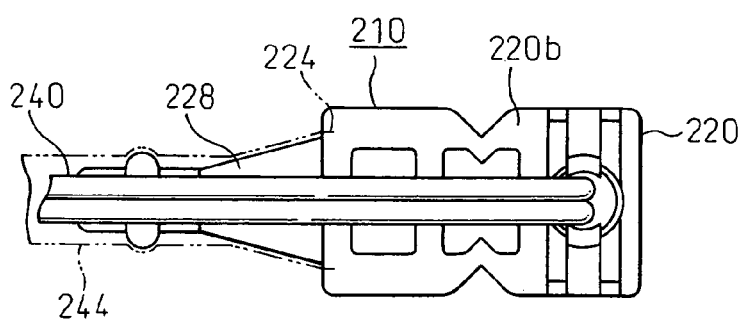
FIG. 11D is a bottom plan view of the evaporator temperature sensor according to the second variant of the fifth embodiment.
Figure 12A:
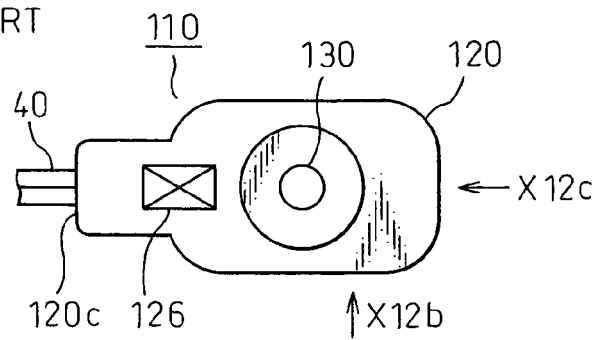
FIG. 12A is a plan view of an evaporator temperature sensor according to a prior art.
Figure 12B:
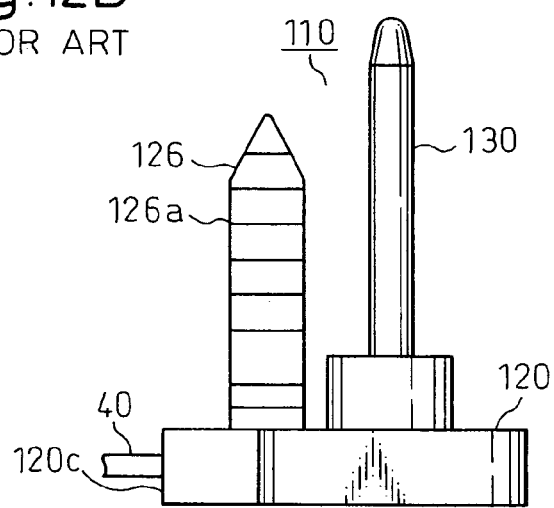
FIG. 12B is an elevation view viewed from the X12b arrow in FIG. 12A.
Figure 12C:
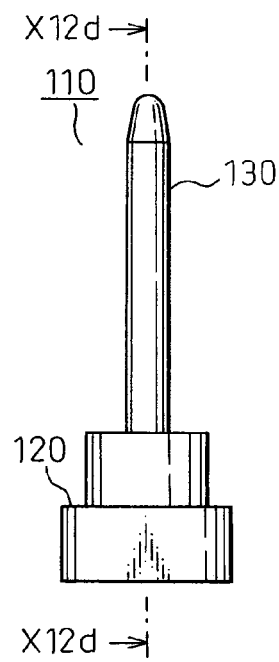
FIG. 12C is an elevation view viewed from the X12c arrow in FIG. 12A.
Figure 12D:
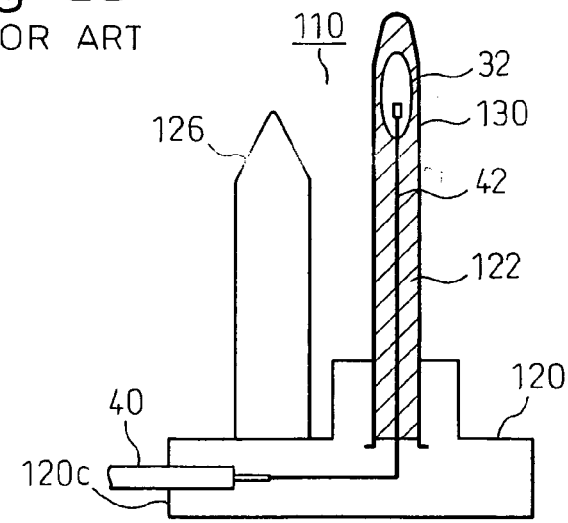
FIG. 12D is a sectional view along the line X12d-X12d in FIG. 12C.
Figure 13:
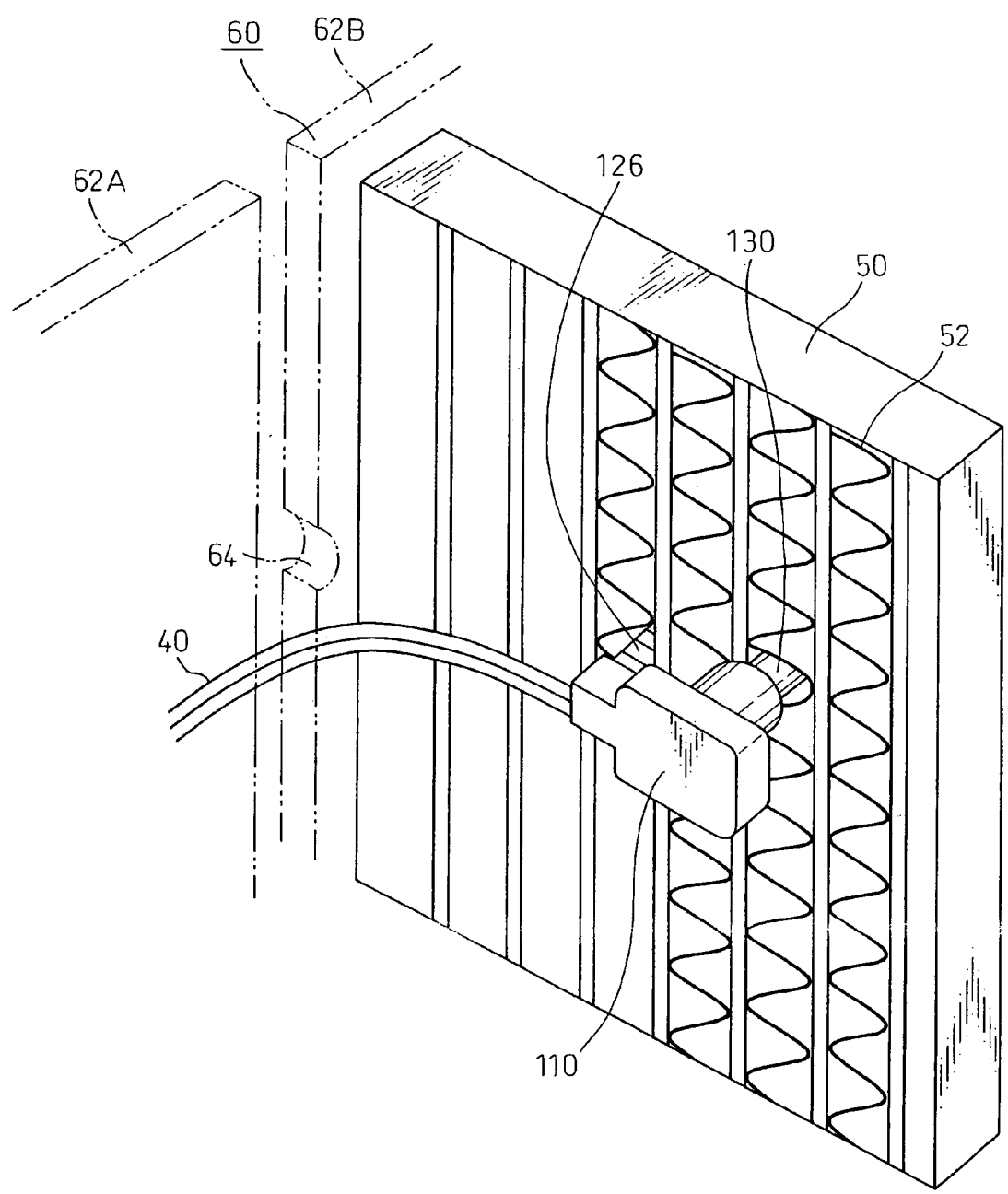
FIG. 13 is a perspective view showing the evaporator temperature sensor according to a prior art which is installed on an evaporator.

FIG. 11A is a plan view of the evaporator temperature sensor according to the second variant of the fifth embodiment, FIG. 11B is an elevation view from the X11b arrow in FIG. 11A, FIG. 11C is an elevation view from the X11c arrow in FIG. 11A, and FIG. 11D is a bottom plan view thereof.

In an evaporator temperature sensor 210 of the second variant of the fifth embodiment, a ring-like groove 224 for receiving the front end of the vinyl tube 244 is formed in the vertical wall 220c of the substrate 220. The rest of the construction thereof is similar to that of the fifth embodiment.

In the second variant of the fifth embodiment, a ring-like groove 224 in the vertical wall 220c of the substrate 220 receives the front end of the vinyl tube 244, so that the vinyl tube 244 is hard to withdraw. As the harness 240 is fixed to the guide portion 228 using the vinyl tube 244, the root portion of the harness 240 at which the harness 240 comes out from the substrate 220 is not broken and disconnected. In the second variant of the fifth embodiment, though the guide portion 228 has a construction similar to that of the fifth embodiment, it is, of course, possible to apply the groove of the second variant of the fifth embodiment to the construction of the guide portion 228 of the first variant of the fifth embodiment.

APPLICABILITY IN INDUSTRY

In the embodiments described above, the examples in which the temperature sensor of the present invention is applied to the evaporator temperature sensor is shown, but it is possible to apply the temperature sensor of the present invention to a temperature sensor for a radiator and further, it can be applied to various sensors. Moreover, it is no need to say that, in the embodiments described above, an example in which an aluminum case is used as a cylindrical metal case is described but a cylindrical metal case made of, for example, copper, stainless steel, or the like can have the construction of the present invention when they are assembled.

While the invention has been described by reference to specific embodiments chosen for the purposes of illustration, it should be apparent that numerous modifications could be made thereto by those skilled in the art without departing from the basic concept and scope of the invention.

The invention claimed is:
1. A temperature sensor comprising:
a cylindrical metal case;
a temperature sensing element, the temperature sensing element being received in a top end of the cylindrical metal case;
an installation portion for installing the temperature sensor to a measured member;
a three-dimensional substrate, the cylindrical metal case and the installation portion being mounted on the three-dimensional substrate in a vertically standing state,
wherein the cylindrical metal case includes a flange portion with an outer diameter enlarged near an opening of the cylindrical metal case and opposite to the top end of the cylindrical metal case,
wherein an upper surface of the substrate has a first through-hole provided thereon, the first through-hole being configured to allow the top end of the cylindrical metal ease to be inserted vertically, the cylindrical metal case penetrating through the upper surface of the substrate,
wherein the substrate includes a hollow portion receiving the flange portion of the cylindrical metal case, the hollow portion communicating with the first through-hole, the hollow portion being provided immediately below the first through-hole,
wherein the substrate includes a second through-hole provided immediately below the hollow portion, the second through-hole being configured to receive the cylindrical metal case,
wherein the substrate is integrally formed with at least a hook portion, the book portion being provided immediately below the hollow portion, the hook portion protruding to the inside of the second through-hole,
wherein the top end of the cylindrical metal case is inserted through the first through-hole of the substrate,
wherein the hollow portion of the substrate receives the flange portion of the cylindrical metal case,
wherein the opening of the cylindrical metal case engages with at least the hook portion, so that the cylindrical metal case is fixed to the substrate,
wherein a lower surface of the substrate includes a groove configured to receive a harness from the temperature sensing element, and
wherein there are provided at least two hook portions including at least the hook portion, the hook portions being disposed in a direction perpendicular to a longitudinal direction of the groove.
2. A temperature sensor comprising:
a cylindrical metal case;
a temperature sensing element, the temperature sensing element being received in a top end of the cylindrical metal case;
an installation portion for installing the temperature sensor to a measured member;
a three-dimensional substrate, the cylindrical metal case and the installation portion being mounted on the three-dimensional substrate in a vertically standing state,
wherein the cylindrical metal case includes a flange portion with an outer diameter enlarged near an opening of the cylindrical metal case and opposite to the top end of the cylindrical metal case,
wherein an upper surface of the substrate has a first through-hole provided thereon, the first through-hole being configured to allow the top end of the cylindrical metal case to be inserted vertically, the cylindrical metal case penetrating through the upper surface of the substrate,
wherein the substrate includes a hollow portion receiving the flange portion of the cylindrical metal case, the hollow portion communicating with the first through-hole, the hollow portion being provided immediately below the first through-hole,
wherein the substrate includes a second through-hole provided immediately below the hollow portion, the second through-hole being configured to receive the cylindrical, metal case,
wherein the substrate is integrally formed with at least a hook portion, the hook portion being provided immediately below the hollow portion, the hook portion protruding to the inside of the second through-hole,
wherein the top end of the cylindrical metal case is inserted through the first through-hole of the substrate,
wherein the hollow portion of the substrate receives the flange portion of the cylindrical metal case, and
wherein the opening of the cylindrical metal case engages with at least the hook portion, so that the cylindrical metal case is fixed to the substrate,
further comprising
a substantially rod-shaped guide portion vertically protruding from a vertical wall of the substrate, and a harness extending from the temperature sensing element, passing through an inside of the cylindrical metal case, and then exiting from the vertical wall of the substrate, wherein the guide portion and the harness are received in a tube, so that the harness is fixed to the guide portion in a contacting state.

3. The temperature sensor as set forth in claim 2, further comprising a rib provided on the guide portion, the rib being configured to prevent withdrawal of the tube.

4. The temperature sensor as set forth in claim 2, wherein the guide portion is divided into two parts and the harness is received in a center space between the divided two parts.

5. The temperature sensor as set forth in claim 2, wherein a ring-shaped groove is provided on the vertical wall of the substrate, the ring-shaped groove being adapted to receive a front end of the tube.

* * * * *